(12) United States Patent
Glain (10) Patent No.: US 11,975,839 B2
(45) Date of Patent: May 7, 2024

(54) LIGHTWEIGHT PASSENGER PRIVACY SCREEN

(71) Applicant: Safran Seats USA LLC, Gainesville, TX (US)

(72) Inventor: Arthur Glain, Boulogne-Billancourt (FR)

(73) Assignee: Safran Seats USA LLC, Gainesville, TX (US)

(*) Notice: Subject to any disclaimer, the term of this patent is extended or adjusted under 35 U.S.C. 154(b) by 678 days.

(21) Appl. No.: 15/734,502

(22) PCT Filed: Aug. 30, 2018

(86) PCT No.: PCT/IB2018/056657
§ 371 (c)(1),
(2) Date: Dec. 2, 2020

(87) PCT Pub. No.: WO2019/239204
PCT Pub. Date: Dec. 19, 2019

(65) Prior Publication Data
US 2021/0229813 A1 Jul. 29, 2021

Related U.S. Application Data

(60) Provisional application No. 62/684,366, filed on Jun. 13, 2018.

(51) Int. Cl.
*B64D 11/06* (2006.01)

(52) U.S. Cl.
CPC ................................ *B64D 11/0606* (2014.12)

(58) Field of Classification Search
CPC ............ B64D 11/0606; B64D 11/0649; B64D 11/00153; B64D 11/0641; E04B 2/7403
See application file for complete search history.

(56) References Cited

U.S. PATENT DOCUMENTS

| 523,380 | A | * | 7/1894 | Snell | .......................... B43L 7/00 33/486 |
| 1,554,179 | A | * | 9/1925 | Trader | ...................... E04B 1/86 D25/155 |

(Continued)

FOREIGN PATENT DOCUMENTS

| AU | 523380 B3 | 8/1982 |
| DE | 29818448 U1 | 12/1998 |

(Continued)

OTHER PUBLICATIONS

Europe Patent Application No. 18782187.1, Notice of Allowance (Communication under Rule 71(3) EPC), dated Jul. 25, 2022, 6 pages.

(Continued)

*Primary Examiner* — Medhat Badawi
(74) *Attorney, Agent, or Firm* — Kilpatrick Townsend & Stockton LLP (57) ABSTRACT

Described are privacy screens and privacy assemblies for passenger seats including a frame defining a perimeter of the privacy screen and shaped to partially wrap around a portion of a passenger seat, a textile shell connected with and surrounding the frame, and a sound-absorbing layer positioned within the frame and surrounded by the textile shell for conferring physical, visual, and sound privacy for an occupant.

9 Claims, 4 Drawing Sheets

(56) References Cited

U.S. PATENT DOCUMENTS

| | | | | |
|---|---|---|---|---|
| 2,674,300 A * | 4/1954 | Liljengren | B64D 11/0639 | 297/43 |
| 2,904,805 A * | 9/1959 | Dardig | B60S 1/66 | 290/51 |
| 4,113,053 A * | 9/1978 | Matsumoto | E01F 8/0076 | 181/284 |
| 4,213,516 A * | 7/1980 | Sulewsky | E04B 1/8409 | 428/156 |
| 5,424,497 A * | 6/1995 | Dias | E04B 2/7409 | 181/290 |
| 5,606,841 A * | 3/1997 | Carter, Jr. | E04B 2/7448 | 52/794.1 |
| 5,675,946 A * | 10/1997 | Verbeek | E06B 3/4663 | 52/64 |
| 6,086,018 A * | 7/2000 | Gobeil | F16B 21/02 | 296/65.13 |
| 6,585,028 B2 * | 7/2003 | Verdicchio | E04B 2/7422 | 52/239 |
| 7,178,871 B1 * | 2/2007 | Round | B64D 11/0641 | 297/217.3 |
| 7,318,622 B2 * | 1/2008 | Rezag | B64D 11/06 | 297/118 |
| 8,011,723 B2 * | 9/2011 | Park | B64D 11/0604 | 244/118.6 |
| 8,313,059 B2 * | 11/2012 | Ferry | B60N 2/3031 | 244/118.6 |
| 8,313,060 B2 * | 11/2012 | Darbyshire | B64D 11/0641 | 244/118.6 |
| 8,931,834 B2 * | 1/2015 | Wallace | B64D 11/0646 | 244/118.6 |
| 9,004,599 B2 * | 4/2015 | Collins | B64D 11/06 | 244/118.6 |
| 10,384,566 B2 * | 8/2019 | Kondrad | B60R 22/26 | |
| 11,498,461 B2 * | 11/2022 | Glain | B60N 2/914 | |
| 11,702,207 B2 * | 7/2023 | Chavarria Garcia | B64D 11/0604 | 244/118.6 |
| 2001/0000639 A1 * | 5/2001 | Park | B60N 2/34 | 297/411.3 |
| 2003/0085597 A1 * | 5/2003 | Ludeke | B64D 11/06 | 297/184.14 |
| 2004/0212243 A1 * | 10/2004 | Johnson | B64D 11/0648 | 297/452.18 |
| 2005/0067870 A1 * | 3/2005 | Rezag | B64D 11/0604 | 297/354.13 |
| 2006/0219843 A1 * | 10/2006 | Martin | B61D 31/00 | 244/118.6 |
| 2007/0040434 A1 * | 2/2007 | Plant | B64D 11/0641 | 297/354.13 |
| 2009/0050740 A1 * | 2/2009 | Saint-Jalmes | B64D 11/0601 | 244/118.6 |
| 2009/0146006 A1 * | 6/2009 | Park | B64D 11/0604 | 244/118.6 |
| 2010/0052382 A1 * | 3/2010 | Dryburgh | B64D 11/0601 | 297/232 |
| 2010/0163674 A1 * | 7/2010 | Bock | B64D 11/06 | 244/118.6 |
| 2010/0252680 A1 * | 10/2010 | Porter | B60R 7/043 | 244/118.6 |
| 2012/0223557 A1 * | 9/2012 | Henshaw | B60N 2/01 | 297/232 |
| 2012/0298798 A1 * | 11/2012 | Henshaw | B64D 11/06 | 244/118.6 |
| 2013/0076082 A1 * | 3/2013 | Herault | B64D 11/0638 | 297/173 |
| 2013/0241247 A1 * | 9/2013 | Wallace | B64D 11/0604 | 297/118 |
| 2013/0248654 A1 * | 9/2013 | Henshaw | B64D 11/06 | 244/118.6 |
| 2014/0035330 A1 * | 2/2014 | Henshaw | B64D 11/06 | 297/217.3 |
| 2014/0239677 A1 * | 8/2014 | Laib | B64D 11/0649 | 297/180.1 |
| 2014/0283296 A1 * | 9/2014 | Jerome | B64D 11/0604 | 5/12.1 |
| 2014/0300148 A1 * | 10/2014 | Frost | B64D 11/0638 | 297/173 |
| 2014/0300171 A1 * | 10/2014 | Velasco | A47C 5/06 | 297/452.18 |
| 2015/0044402 A1 * | 2/2015 | Carson, Jr. | A47C 5/12 | 428/34.5 |
| 2015/0283927 A1 * | 10/2015 | Velasco | B60N 2/803 | 297/391 |
| 2015/0321592 A1 * | 11/2015 | De Morais | B64D 11/0646 | 297/135 |
| 2015/0336674 A1 * | 11/2015 | Foucher | B64D 11/0606 | 244/118.6 |
| 2017/0283064 A1 * | 10/2017 | Robinson | E06B 3/509 | |
| 2018/0105273 A1 * | 4/2018 | Robinson | B64D 11/0606 | |
| 2018/0215469 A1 * | 8/2018 | Uriu | B60N 2/22 | |
| 2018/0281963 A1 * | 10/2018 | Dowty | B64D 11/0606 | |
| 2019/0193616 A1 * | 6/2019 | Cansfield | B64D 11/0601 | |
| 2019/0389583 A1 * | 12/2019 | Constantin | B64D 11/0641 | |
| 2021/0107657 A1 * | 4/2021 | Ozaki | B60N 2/686 | |
| 2021/0114735 A1 * | 4/2021 | Ozaki | B60N 2/01575 | |
| 2021/0137272 A1 * | 5/2021 | Brooks | A47C 7/002 | |
| 2021/0229813 A1 * | 7/2021 | Glain | B64D 11/0606 | |
| 2021/0237880 A1 * | 8/2021 | Gaston | B64D 11/0606 | |
| 2021/0300563 A1 * | 9/2021 | Maurmaier | B64D 11/0638 | |
| 2021/0387732 A1 * | 12/2021 | Salzer | B64D 11/0648 | |
| 2021/0402897 A1 * | 12/2021 | Glain | B60N 2/34 | |
| 2022/0017224 A1 * | 1/2022 | Glain | B64D 11/0602 | |
| 2022/0017225 A1 * | 1/2022 | Mansouri | B64D 11/0601 | |
| 2022/0371737 A1 * | 11/2022 | O'Neill | B61D 1/04 | |
| 2023/0182902 A1 * | 6/2023 | Vuagniaux | B64D 11/0023 | 244/118.6 |

FOREIGN PATENT DOCUMENTS

| | | |
|---|---|---|
| DE | 102010063488 A1 | 6/2012 |
| FR | 2904805 A1 | 2/2008 |

OTHER PUBLICATIONS

International Patent Application No. PCT/IB2018/056657, Search Report and Written Opinion, dated Feb. 18, 2019.

Europe Patent Application No. 18782187.1, Decision to Grant, dated Sep. 29, 2022.

* cited by examiner

LIGHTWEIGHT PASSENGER PRIVACY SCREEN

CROSS REFERENCE TO RELATED APPLICATIONS

This application is related to and claims priority benefits from U.S. Provisional Application Ser. No. 62/684,366 ("the '366 application"), filed on Jun. 13, 2018, entitled VERSATILE ECONOMY CLASS SEAT. The '366 application is hereby incorporated in its entirety by this reference.

FIELD OF THE INVENTION

The field of the invention relates to privacy screens for passenger spaces.

BACKGROUND

In commercial aircraft, passenger privacy and comfort are of paramount importance, with various structures already directed to maintaining visual, noise and physical privacy for passengers, particularly in first-class seating. Unlike ground-based transport, where space concerns are often sufficiently lax that private cabins are possible, the limitations on cabin space require alternative means to provide separation for passengers. In existing aircraft designs, physical privacy is currently achieved by a solid composite assembly, typically formed of a honeycombed polymer/fiberglass or metal/thermoplastic construction, that partially encloses the a passenger seat and provides a measure of sound separation, visual separation, and physical isolation. However, such assemblies must be rigidly connected with the floor of the aircraft and capable of withstanding significant physical shock. Due to these and other structural and safety concerns, traditional privacy assemblies are relatively heavy and bulky, and improved solutions for passenger privacy are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a privacy screen for a passenger seat can include a frame defining a perimeter of the privacy screen and shaped to partially wrap around a portion of a passenger seat, with a lightweight textile shell connected with and surrounding the frame. The lightweight textile shell can further contain a sound-absorbing layer positioned within the frame and surrounded by the textile shell. The privacy screen can include connecting features for attaching with an upper portion of a rigid passenger privacy assembly.

According to various embodiments, the frame of a privacy screen can include a lightweight tubular or C-channel member that runs along and interior to the perimeter of the privacy screen. The textile shell may include any suitable fabric, typically a coarse woven fabric, but may also include any suitable woven or nonwoven textile material. In some embodiments, the frame can also include an internal support member crossing inside the perimeter of the privacy screen and internal to the textile shell, which can be used as a mounting element for audiovisual equipment such as entertainment devices, video players, touchscreens, or even tray tables and the like. In some embodiments, a support element can project from the textile shell and serve as a support or connection point to support an electronic display.

According to various embodiments, the frame of a privacy screen can define an L-shaped profile sized to pass behind a rear portion of the passenger seat and wrap around a side of the passenger seat to provide visual privacy from the back and at least one side of the seat. The L-shaped profile can wrap around a left or right side of the passenger seat; or in some embodiments the privacy screen can define a C-shaped profile sized to pass behind the rear portion of the passenger seat and partially enclose the passenger seat on two sides. The sound-absorbing layer contained in the textile shell can include any suitable noise-attenuating material, including various elastomers or noise-attenuating polymer foams, such as but not limited to polyester, polyurethane, or other suitable sound dampening materials. According to many embodiments, the textile shell and the sound-absorbing layer are composed of flame-retardant materials.

According to at least some embodiments, the textile shell of a privacy screen is configured for simple installation and removal, e.g. for cleaning or replacement, and can include a temporary closure such as a hidden opening, zippered closure, touch fastener closure, buttoned closure, or snap closure, to permit a technician to readily detach and remove or install the textile shell onto the frame. In some embodiments, the sound absorbing layer is also removably attached with the frame, for example, being supported by the frame and textile shell without being rigidly connected thereto. Alternatively, in some embodiments where the frame is a C-section support rather than an enclosed tube, the sound absorbing layer can be sized to fit within an open part of the frame when installed. In some embodiments, the textile shell can enclose a rigid panel positioned within the textile shell and connected to one of the frame or textile shell, in addition to or in lieu of a pliable noise-attenuating material. Such rigid panels may also be sound-absorbing, or may provide structural rigidity to the textile shell.

Privacy screens may be on the order of about 45 to 75 cm tall (about 18-30") and may have a length in the range of 50 to 305 cm (20" to 120"), depending on the specific geometry of the screen. In some embodiments, a central portion of the privacy screen containing the sound absorbing layer within the textile shell can have a thickness ranging from about 0.165 to 1.175 cm (0.25" to 1.25"). Optionally, the privacy screen textile shell can include an outer surface with a projection surface for displaying a projected image.

According to certain embodiments of the present disclosure, a privacy enclosure for a passenger seat can include a rigid structural shell shaped to partially enclose a lower portion of a passenger seat and configured to attach to a floor, and a privacy screen connected with the structural shell and shaped to partially enclose an upper portion of the passenger seat above the structural shell. The privacy screen configured for attachment to the rigid shell can include any of the features described above, e.g., a frame defining a perimeter of the privacy screen and shaped to partially wrap around the upper portion of a passenger seat, a textile shell connected with and surrounding the frame, and a sound-absorbing layer positioned within the frame and surrounded by the textile shell.

According to at least some embodiments, the privacy enclosure as a whole can define an L-shaped profile arranged to at least partly enclose a back of the passenger seat and at least one side of the passenger seat. privacy screen may also include a display device connected with the privacy screen and positioned for use by an occupant of a different seat than the seat enclosed. The privacy screen may be reversible attached to the structural shell, e.g. by removable bolts, screws, clamping elements or other connectors, or may be permanently connected.

According to certain embodiments of the present disclosure, a passenger seat assembly for a passenger space can include a passenger seat configured to attach to a floor, a rigid structural shell shaped to partially enclose a lower portion of the passenger seat and configured to attach to the floor adjacent the passenger seat, and a privacy screen connected with the structural shell and shaped to partially enclose an upper portion of the passenger seat above the structural shell, the privacy screen including any of the features described above. In some embodiments, the privacy screen can include a lightweight frame defining a perimeter of the privacy screen and shaped to partially wrap around the upper portion of a passenger seat, a textile shell connected with and surrounding the frame, and a sound-absorbing layer positioned within the frame and surrounded by the textile shell to partially surround the upper portion of the passenger seat, conferring privacy and attenuating sound for an occupant.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat enclosures and privacy screens for passenger seats. While the privacy screens and enclosures are discussed for use with aircraft seats, they are by no means so limited. Rather, embodiments of the privacy screens and enclosures may be used in passenger seats or other seats of any type or otherwise as desired.

Figure 1:
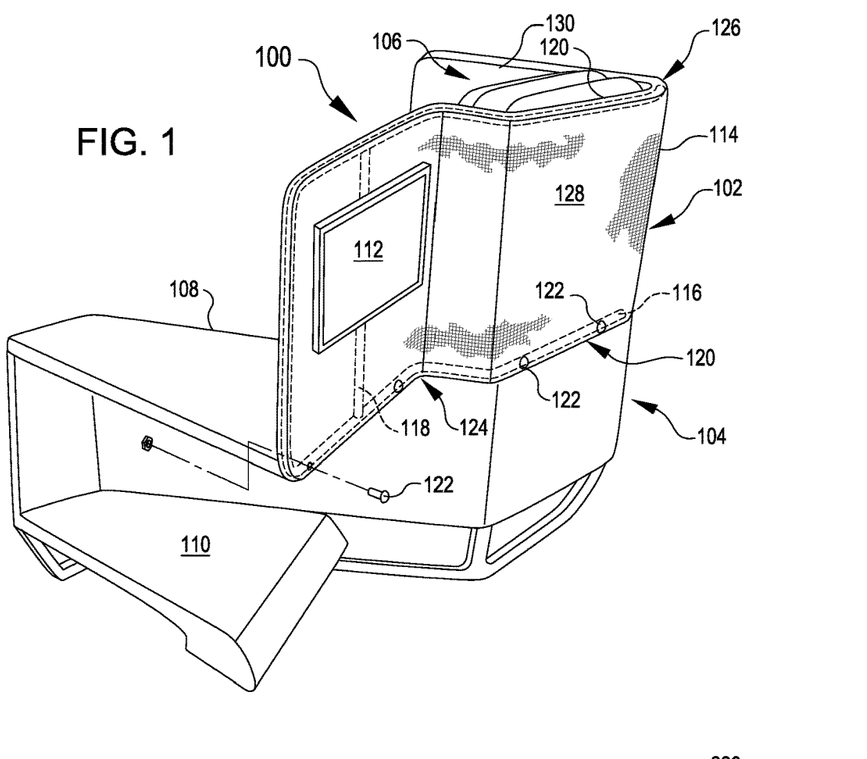
FIG. 1 is a perspective view showing a first example of a passenger seat assembly including a privacy screen, according to certain embodiments of the present disclosure.

According to certain embodiments of the present invention, as shown in FIG. 1, a passenger seat assembly 100 includes a lightweight privacy screen 102 connected with a rigid shell 104, which is independent connected with the aircraft floor proximate to and partly wrapping around a passenger seat 106. The rigid shell 104 can include various features for convenience, comfort, and privacy of not only the intended occupant of the corresponding seat 106, but adjacent occupants as well. For example, the rigid shell 104 can define a personal table 108 for an occupant of the associated seat 106, as well as an ottoman/compartment 110 for use by the adjacent passenger.

The rigid shell 104 may include various other features as well that are known in the art, e.g., controls, pockets, media devices, and the like. Generally, the rigid shell 104 is rigidly attached to the aircraft floor and capable of withstanding substantial acceleration, deceleration, and shock; while the passenger seat 106 is rigidly connected to the floor separately from the rigid shell 104 and at significantly higher tolerances to withstand and protect passengers in an impact event or the like.

The privacy screen 102 includes a textile shell 114 that tightly encloses a lightweight frame 116, the frame perimeter 120 defining the shape of the privacy screen. According to various embodiments, the frame 116 is a lightweight metal tube structure, but may be composed of a variety of structural materials, including but not limited to aluminum, stainless steel, aramid fibers, polycarbonate, polypropylene, other metallic materials, composite materials, or other similar materials. In some embodiments, the frame 116 is a tubular structure, but may also be formed in a variety of high-strength, lightweight shapes, such as C-channel or bracketed shapes, trussed shapes, or other suitable alternatives. The size of the frame 116 can vary greatly depending on location and application, but according to some specific embodiments, the frame as assembled may have a height in the range of 45 to 75 cm (about 18-30") and a length in the range of 50 to 305 cm (20" to 120"). These dimensions translate approximately to the size of the privacy screen 102, which is defined in dimension by the internal frame 116.

According to some embodiments, the frame 116 can define an S-shaped construction having a central bend 124 that both partially encloses the passenger seat 106 and provides additional rigidity to the privacy screen 102. Further, in some embodiments, the frame 116 can also define an L-shaped extension 126 forming a back portion 128 that runs behind a passenger seat 106 and a side portion 130 that runs alongside the passenger seat. The back and side portions 128, 130 can each or both include sound attenuating features that help to improve the sound privacy of an occupant of the passenger seat 106.

According to at least some embodiments, the privacy screen 102 can be connected with the rigid shell 104 by way of removable connectors 122, such as bolts, screws, removable pins, or other suitable connectors. In some embodiments, the privacy screen 102 may be permanently connected with the rigid shell 104. Generally, such connectors 122 pass through the frame 116, thus rigidly attaching the privacy screen 102 with the rigid shell 104.

According to some embodiments, the privacy screen 102 includes an additional internal support 118 placed to provide an attachment point and support for a display device 112, such as an onboard media device. Similar internal supports may be positioned at any suitable location in the textile shell 114 and be accessible through the shell for connection to suitable devices. Alternatively, such internal supports may be used to support receptacles, e.g. for personal media devices, food and beverages, and other personal items, to support tray tables, or for other uses. In some cases, additional internal supports 118 may be configured with channels suitable for containing wiring for media devices.

In some alternative embodiments, privacy screen elements as described herein may also be attached to portions of the passenger seat 106. A variety of specific configurations of privacy screens and shells are possible within the spirit of this disclosure, including passenger screens and shells that provide more or less coverage than the embodiments shown in FIG. 1. For example, an example privacy screen having less coverage than that of FIG. 1 is shown in FIG. 2.

Figure 2:
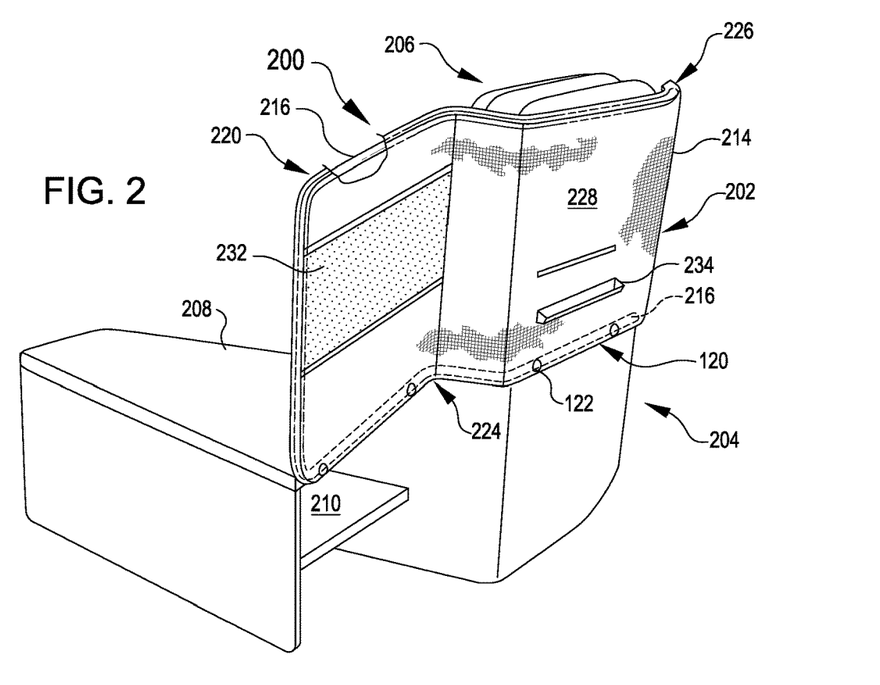
FIG. 2 is a perspective view showing a second example of a passenger seat assembly including a privacy screen, according to various embodiments of the present disclosure.

FIG. 2 is a perspective view showing a second example of a passenger seat assembly 200 including a privacy screen 202, according to various embodiments of the present disclosure. In similar manner to the privacy screen 102 described above, privacy screen 202 also includes a textile shell 214 that tightly encloses a lightweight frame 216, the frame perimeter 220 defining the shape of the privacy screen. The privacy screen 202 is connected with a second example of rigid shell 204 partly wrapping around a passenger seat 206. The rigid shell 204 can include any suitable features described with reference to the previous rigid shell 104, and other features. As shown, the rigid shell 204 includes a personal table 208 for an occupant of the associated passenger seat 206 and a compartment 210 for use by an adjacent passenger.

According to various embodiments, the frame 216 may also define an S-shaped construction having a central bend 224 to provide additional strength to the privacy screen 202, but defines a smaller L-shaped extension 226. Instead of forming an elongated screen along the side of the passenger seat 206, the privacy screen 202 defines a simple forward/aft screen. The back portion 228 can include sound attenuating features similar to those described above. The privacy screen 202 may also be connected with the rigid shell 204 by way of multiple connectors 122, which may be removable.

In some embodiments, the back portion 228 of the privacy screen 202 can also be used to support a variety of elements including, but not limited to, one or more pockets or pouches 234 for supporting personal effects or personal media devices, e.g. tablets, cell phones, or the like. Additionally, according to some embodiments, a back portion 228 of the privacy screen 202 can include a projection surface 232, such as a matte white or other suitably bright, smooth surface suitable as a media surface for a projector.

Figure 3:
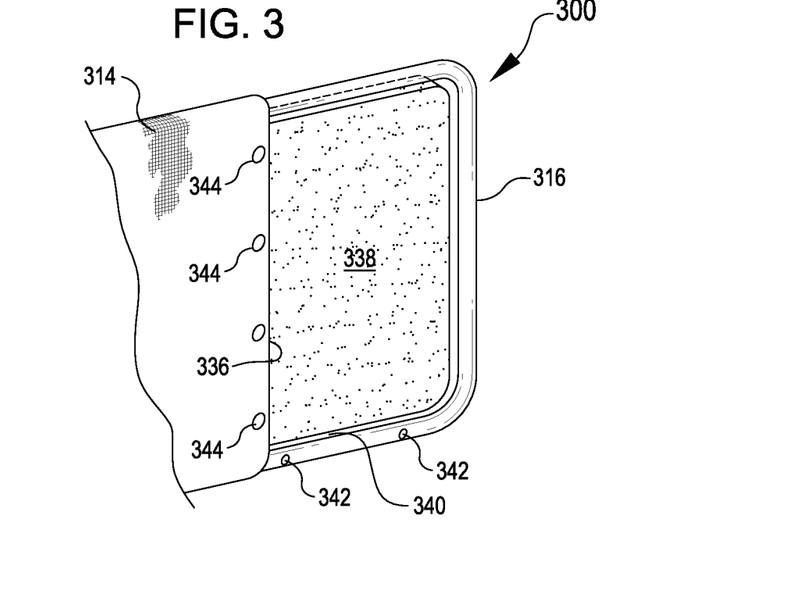
FIG. 3 is a detailed perspective view showing aspects of an example of a privacy screen compatible with the passenger seat assemblies of FIGS. 1 and 2, according to at least some embodiments.

FIG. 3 is a detailed perspective view showing aspects of an example of a privacy screen 300 compatible with the passenger seat assemblies of FIGS. 1 and 2, according to at least some embodiments. The privacy screen 300 includes an internal frame 316 which is surrounded and encased by a textile shell 314. In some embodiments, the textile shell 314 is permanently attached to the frame 316, but in most embodiments the textile shell can be installed and removed, e.g. for cleaning or occasional repair. In at least one embodiment, the textile shell 314 can be slid on and over the internal frame 316, generally while the frame 316 is also uninstalled. In some embodiments, e.g. where the textile shell 314 can be applied over the top of the frame 316, the textile shell can be removed and replaced at a seat assembly even when the frame 316 remains firmly attached to an underlying rigid shell or other component.

According to at least some embodiments, a series of connection points or holes 342 can be bored into or otherwise preinstalled in the frame 316 prior to installation of the textile shell 314 over the frame. Similarly, a sound attenuating layer 338, such as a sound dampening open cell foam, closed cell foam, or suitable elastomer, may be positioned within the bounds of the frame 316, e.g. in an interior space 340, before the textile shell 314 is slid over the frame. The open end 336 of the textile shell 314 can include various forms of removable or permanent closures. According to at least some embodiments, the textile shell 314 is readily removable from the frame 316, and may be closed after installation by way of a set of shell closures 344, which can include snaps, buttons, magnetic closures, touch-adhesive closures or touch fasteners, zippers, or the like. In some alternative embodiments, the textile shell 314 can be permanently enclosed over the textile shell 314 and sound attenuating layer 338, e.g. by adhesive, plastic welding, a sewn closure, or the like. In some embodiments, the open end 336 may be left open, and merely concealed, e.g. at an interface between the privacy screen 300 and a rigid shell to which the screen is attached.

Figure 4:
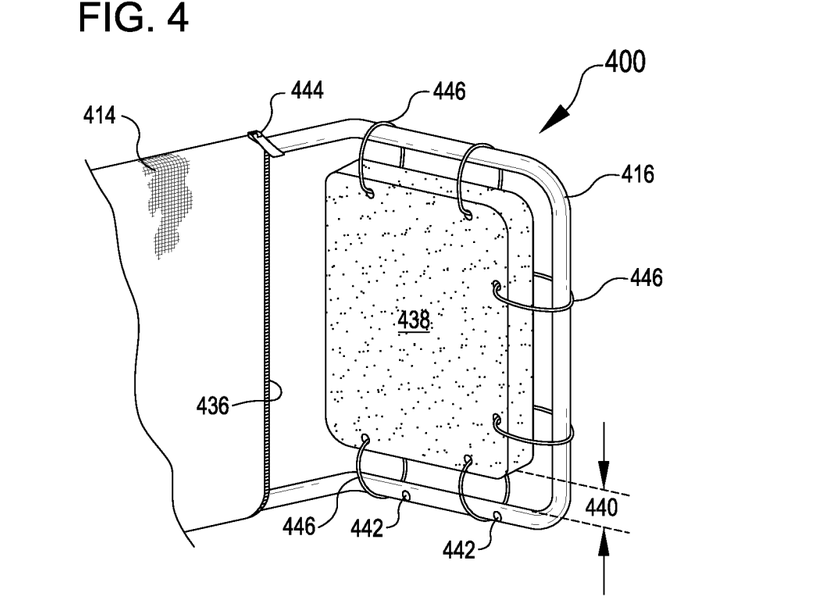
FIG. 4 is a detailed perspective view showing aspects of a second example of a privacy screen.

Privacy screens may take on a variety of configurations and specific constructions. FIG. 4 is a detailed perspective view showing aspects of a second example of a privacy screen 400. The privacy screen 400 also includes a textile shell 414 that is connected with a frame 416 by sliding the textile shell over the frame and securing the shell. The frame 416 is connectible with a suitable rigid shell or other structure by way of attachment points 442, configurable to receive attachment elements like connectors 122 (FIG. 1). The frame 416 can be bent to define an L-shaped profile without impeding coverage by the textile shell 414, and may also hold a sound attenuating layer 438 in a variety of ways. The textile shell 414 may be secured in place after installation in a variety of ways, including all of those discussed above with respect to textile shell 314, such as a zipper 444, and its respective teeth 436, as shown.

In some embodiments, the sound attenuating layer 438 may be placed within the frame 416 and then held in place by the combination of the frame and secured textile shell 414. Alternatively, the sound attenuating layer 438 may be attached inside the frame by a variety of suitable attachment elements, including adhesives, pins, screws, and even ties 446, as shown. In some embodiments, the sound attenuating layer 438 can include a rigid panel, or may be replaced in part or in whole by a set of rigid panels, placed and retained according to any of the methods described herein for retaining an attenuating layer. In some embodiments, the sound attenuating layer 438 can be a rigid panel or a layered assembly of a sound attenuating material on a rigid substrate. The sound attenuating layer 438 may have a nonzero clearance 440 between the layer and the frame 116, or may have no clearance.

Figure 5:
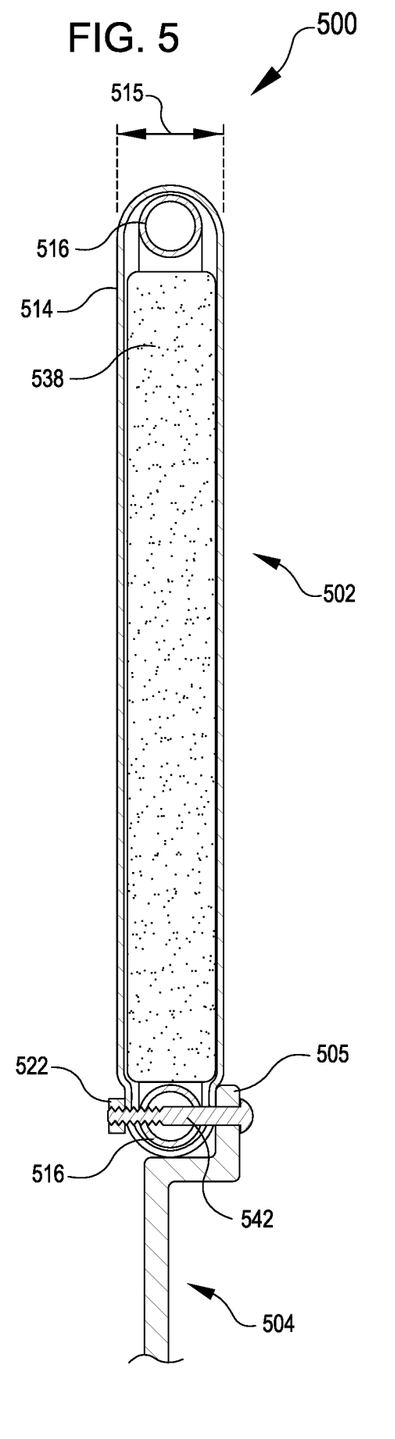
FIG. 5 is a side section view showing an interior cross-section of a privacy screen, according to various embodiments.

FIG. 5 is a side section view showing an interior cross-section of a privacy screen assembly 500, according to various embodiments. The construction of the privacy screen assembly 500 can be applied to any other privacy screen described herein. The privacy screen 502 and includes an outer shell 514 stretched over a frame 516, and containing a sound attenuating layer 538 and/or rigid layer inside the shell and supported within the perimeter of the frame. According to various embodiments, the sound attenuating layer 538 can rest within the frame 516 without additional support or securement, or may be connected with either the frame 516 or an interior of the textile shell 514. A width of the privacy screen containing the sound absorbing layer within the textile shell may vary greatly in thickness depending on the specific material and quantity of sound attenuating material selected. According to some embodiments, the privacy screen, containing the sound absorbing layer, can have a thickness of from 0.165 to 1.175 cm (0.25" to 1.25").

The privacy screen 502 can be connected at a lower extent of the screen with an upper extent of a rigid shell 504. According to some embodiments, this connection may occur at a flanged portion 505 of the rigid shell 504 shaped to made with and/or support the privacy screen 502. Many specific connections are possible, including clamps, screws, rivets, or the like. As shown, a bolt and nut assembly 522 is connected through a connection point 542 of the frame 516.

Figure 6:
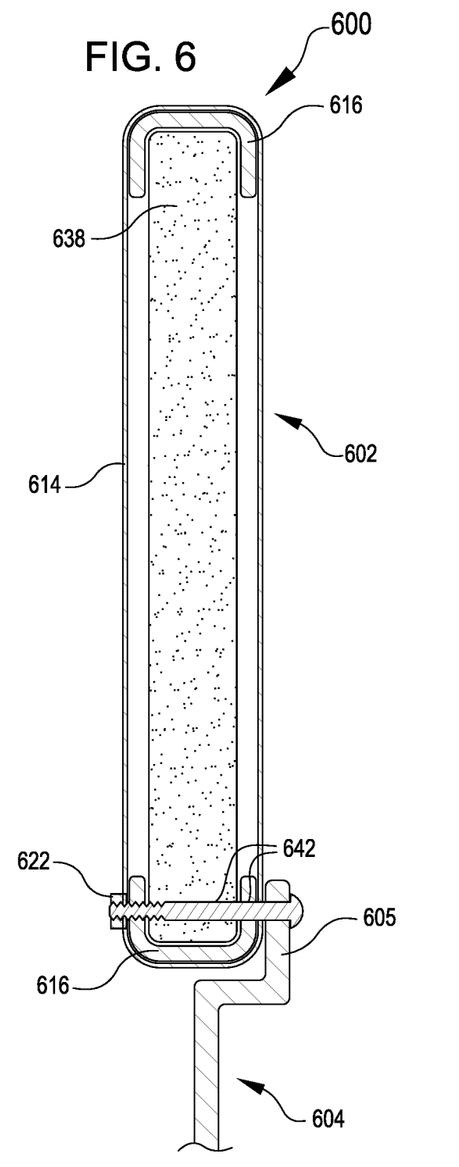
FIG. 6 is a side section view showing an interior cross-section of an alternative construction of a privacy screen, according to various embodiments.

FIG. 6 is a side section view showing an interior cross-section of an alternative construction of a privacy screen assembly 600, according to various embodiments. This construction may also be applied to any other privacy screen described herein. As shown in FIG. 6, a privacy screen 602 can include a frame 616 having an open shape, e.g. a C-conduit or the like, although similar features are available with any suitable bracket shape, I-beam shape, or other comparably open profile. A sound attenuating layer 538 and/or rigid layer can be positioned inside profile of the frame 616, and then enclosed by the textile shell 614. The privacy screen 602 can be connected at a lower extent of the screen with an upper extent of a rigid shell 604 according to similar methods described above with respect to privacy screen assembly 500, e.g. by way of a connector assembly 622 routed through a connection point 642 on the frame 616, and connected with an upper, flanged portion 605 of the rigid shell 604.

Figure 7:
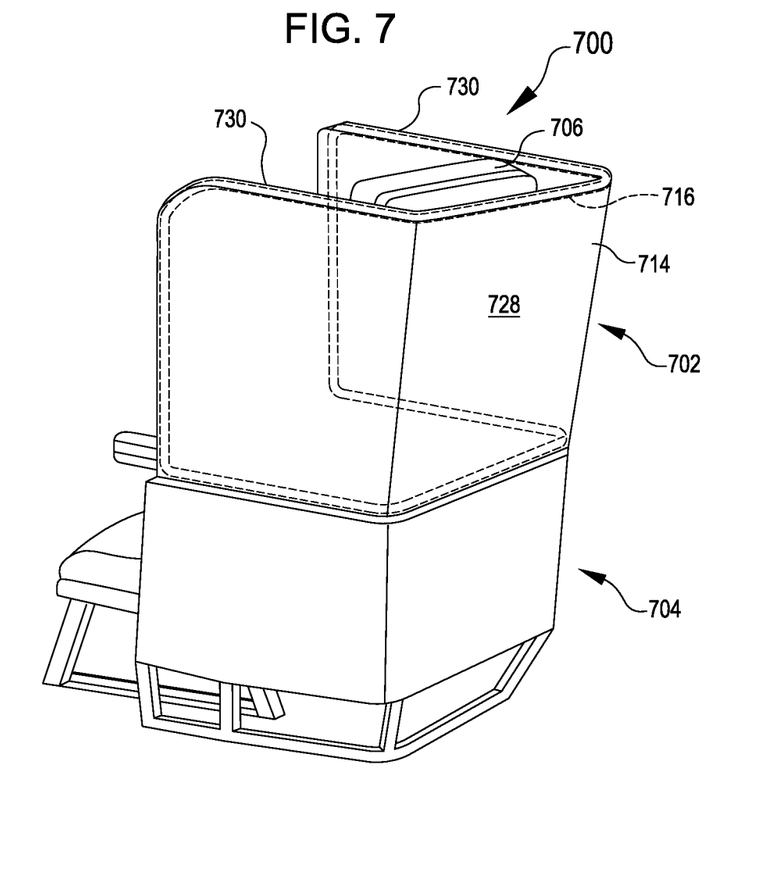
FIG. 7 is a perspective view showing a third example of a passenger seat assembly including a privacy screen, according to various embodiments of the present disclosure.

A variety of passenger screen shapes can be achieved at low cost and low weight using the above-described structures, including passenger screens tailored to small or large seating arrangements, or dividers between seats, or other elements. FIG. 7 is a perspective view showing a nonlimiting, third example of a passenger seat assembly including a privacy screen 702 that wraps around both sides of a passenger seat, according to various embodiments of the present disclosure. As shown, a passenger seat assembly 700 can include a rigid shell 704 arranged wrapping around a passenger seat 706, and a privacy screen 702 connected with a topmost extent of the rigid shell and further wrapping around an upper portion of the passenger seat. Similar to the privacy screens described above (e.g. 102, FIG. 1), the privacy screen 702 includes an internal frame 716 shaped to define L-shaped extensions 730 that partly enclose the passenger seat 706. A textile shell 714 contains the internal frame, and defines the L-shaped extensions 730 and back portion 728 of the privacy screen 702.

In some alternative embodiments, privacy screens as described herein may be attached to different substrates than to rigid, floor-mounted frames. For example, some privacy screens may be attached with alternative support structures, such as a passenger compartment floor, wall, or ceiling, or may be attached directly to a passenger chair. In some embodiments, a privacy screen may be connected with and arranged to move with a passenger chair that reclines.

In the following, further examples are described to facilitate the understanding of the invention:

Example A. A privacy screen for a passenger seat, comprising: a frame defining a perimeter of the privacy screen and shaped to partially wrap around a portion of a passenger seat, a textile shell connected with and surrounding the frame, and a sound-absorbing layer positioned within the frame and surrounded by the textile shell.

Example B. The privacy screen of any of the preceding or subsequent examples, wherein the frame comprises a lightweight tubular or C-channel member.

Example C. The privacy screen of any of the preceding or subsequent examples, wherein the textile shell comprises a coarse woven fabric.

Example D. The privacy screen of claim 1, any of the preceding or subsequent examples, wherein the frame further comprises an internal support member crossing inside the perimeter of the privacy screen and internal to the textile shell.

Example E. The privacy screen of any of the preceding or subsequent examples, wherein the internal support member further comprises a support element projecting from the textile shell and configured to support an electronic display.

Example F. The privacy screen of any of the preceding or subsequent examples, wherein the frame defines an L-shaped profile sized to pass behind the portion of the passenger seat and wrap around a side of the passenger seat.

Example G. The privacy screen of any of the preceding or subsequent examples, wherein the frame defines a C-shaped profile sized to pass behind the portion of the passenger seat and partially enclose the passenger seat on two sides.

Example H. The privacy screen of any of the preceding or subsequent examples, wherein the sound-absorbing layer comprises a noise-attenuating polymer foam.

Example I. The privacy screen of any of the preceding or subsequent examples, wherein the textile shell and the sound-absorbing layer are comprise flame-retardant materials.

Example J. The privacy screen of any of the preceding or subsequent examples, wherein the textile shell comprises a temporary closure comprising one of a hidden opening, zippered closure, touch fastener closure, buttoned closure, or snap closure.

Example K. The privacy screen of any of the preceding or subsequent examples, wherein the sound absorbing layer is supported by the frame and textile shell without being rigidly connected thereto.

Example L. The privacy screen of any of the preceding or subsequent examples, further comprising a rigid panel positioned within the textile shell and connected to one of the frame or textile shell.

Example M. The privacy screen of any of the preceding or subsequent examples, wherein the frame has a height in the range of 45 to 75 cm (about 18-30") and a length in the range of 50 to 305 cm (20" to 120").

Example N. The privacy screen of any of the preceding or subsequent examples, wherein a central portion of the privacy screen containing the sound absorbing layer within the textile shell has a thickness of from 0.165 to 1.175 cm (0.25" to 1.25").

Example O. The privacy screen of any of the preceding examples, wherein an outer surface of the textile shell comprises a projection surface for displaying a projected image.

Example P. A privacy enclosure for a passenger seat, comprising: a rigid structural shell shaped to partially enclose a lower portion of a passenger seat and configured to attach to a floor, and a privacy screen according to any of the preceding examples.

Example Q. The privacy enclosure of any of the preceding or subsequent examples, wherein each one of the structural shell and privacy screen define an L-shaped profile arranged to at least partly enclose a back of the passenger seat and at least one side of the passenger seat.

Example R. The privacy enclosure of any of the preceding or subsequent examples, further comprising an display device connected with the privacy screen.

Example Q. The privacy enclosure of any of the preceding examples, wherein the privacy screen is removably attached to the structural shell.

Example S. A passenger seating assembly, comprising: a passenger seat configured to attach to a floor; a rigid structural shell shaped to partially enclose a lower portion of the passenger seat and configured to attach to the floor adjacent the passenger seat; and a privacy screen according to any of the preceding examples, the privacy screen connected with the structural shell and shaped to partially enclose an upper portion of the passenger seat above the structural shell.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly, comprising:
   a passenger seat configured to attach to a floor;
   a structural shell shaped to partially enclose a lower portion of the passenger seat and configured to attach to the floor adjacent to the passenger seat; and
   a privacy screen connected with the structural shell and shaped to partially enclose an upper portion of the passenger seat above the structural shell, the privacy screen comprising:
   a frame defining a perimeter of the privacy screen and shaped to partially wrap around the upper portion of the passenger seat;
   a textile shell connected with and surrounding the frame; and
   a sound-absorbing layer positioned within the frame and surrounded by the textile shell;
   wherein the frame further comprises:
   a first portion;
   a second portion including a first end and a second end, wherein the first end of the second portion is coupled to the first portion by a first bend, wherein the first portion is positioned adjacent to a first end of the first bend and the second portion is positioned to a second end of the first bend; and
   a third portion coupled to the second end of the second portion by a second bend, wherein the third portion is positioned substantially perpendicular to the second portion,
   wherein the first portion and the second portion are configured to partially wrap around the upper portion of the passenger seat, and wherein the third portion are configured to partially wrap around a side of the passenger seat,
   wherein the first portion of the frame further comprises an internal member crossing inside the perimeter of the privacy screen and internal to the textile shell, wherein the internal member further comprises a support element projecting from the textile shell and configure to support an electronic display, and wherein the electronic display is positioned on a side of the privacy screen opposite the passenger seat.

2. The passenger seat assembly of claim 1, wherein the frame comprises a tubular or C-channel member.

3. The passenger seat assembly of claim 1, wherein the textile shell comprises a woven fabric.

4. The passenger seat assembly of claim 1, wherein the sound-absorbing layer comprises a noise-attenuating polymer foam.

5. The passenger seat assembly of claim 1, wherein the textile shell and the sound-absorbing layer comprises flame-retardant materials.

6. The passenger seat assembly of claim 1, wherein the textile shell comprises a temporary closure comprising one of a hidden opening, zippered closure, touch fastener closure, buttoned closure, or snap closure.

7. The passenger seat assembly of claim 1, wherein further comprising a panel positioned within the textile shell and connected to one of the frame or textile shell.

8. The passenger seat assembly of claim 1, wherein an outer surface of the textile shell comprises a projection surface for displaying a projected image.

9. The passenger seat assembly of claim 1, wherein the privacy screen is removably attached to the structural shell.

* * * * *